United States Patent [19]

Semmerling

[11] 3,973,302

[45] Aug. 10, 1976

[54] CLIP FOR ATTACHING HEADER TO I-BEAM

[75] Inventor: Ralph P. Semmerling, Chicago, Ill.

[73] Assignee: United States Gypsum Company, Chicago, Ill.

[22] Filed: May 23, 1975

[21] Appl. No.: 580,259

[52] U.S. Cl. .............................. 24/243 AB; 52/484; 403/387
[51] Int. Cl.² ...................... A44B 21/00; E04B 5/52
[58] Field of Search ............. 52/489, 719, 484, 760; 403/387, 398, 400, 403, 406; 24/243 AB, 243 CR; 248/72, 317, 228

[56] References Cited
UNITED STATES PATENTS

| | | | |
|---|---|---|---|
| 656,275 | 8/1900 | Streeter | 403/387 |
| 728,919 | 5/1903 | Horn | 403/387 |
| 879,905 | 2/1908 | Rhorer | 403/387 |
| 1,709,047 | 4/1929 | Walper | 248/228 UX |
| 1,879,459 | 9/1932 | Pelton | 403/406 X |
| 2,586,327 | 2/1952 | Haertel | 52/484 X |
| 3,295,284 | 1/1967 | Tschiesche | 52/484 X |
| 3,315,995 | 4/1967 | Hossli et al. | 403/387 |

FOREIGN PATENTS OR APPLICATIONS

| | | | |
|---|---|---|---|
| 611,699 | 1/1961 | Canada | 52/489 |
| 1,000,729 | 10/1951 | France | 403/400 |
| 294,607 | 2/1954 | Switzerland | 52/760 |

Primary Examiner—Donald A. Griffin
Attorney, Agent, or Firm—Donnie Rudd; Samuel Kurlandsky; Kenneth E. Roberts

[57] ABSTRACT

A clip is disclosed for insertion into a C-shaped header for use in stiffening the header and concurrently attaching the stiffened header to an I-beam or the like. The clip includes a portion for insertion into the channel of the C-shaped header, said portion substantially filling a cross-section of the channel and contacting a substantial portion of the interior walls thereof, and one wall of the clip having integrally depending from one end thereof at least one leg or clip for engaging the I-beam and attaching thereto.

10 Claims, 12 Drawing Figures

CLIP FOR ATTACHING HEADER TO I-BEAM

BACKGROUND OF THE INVENTION

1. Field of the Invention

This invention relates to a clip for attaching C-shaped headers to I-beams.

2. Description of the Prior Art

The use of cold-formed, C-shaped steel joists, i.e., joists having a C-shaped cross-section, is a relatively recent development in the construction industry. Such joists provide an inexpensive lightweight, fireproof, high strength system for construction thereby replacing wood and other prior materials. One problem associated with C-shaped steel joists, however, is that where the joist is supported by an I-beam or the like, the C-shaped section tends to be pinched together along the gap in the C thereby deforming the joist and creating an uneven surface for the floor or the like that is to be attached over the joist. The method for overcoming this problem has generally been to insert a wood block into the C-shaped joist to stiffen it and hold it together. The C-shaped joist is then attached to the wood block by screws or the like inserted through the joist, and the joist is attached to the I-beam by any of several means such as some type of clip arrangement positioned at the back of the joist or else a clip arrangement which is nailed to or otherwise attached to the wood block. Alternatively, straight attachment of the bottom of the steel joist to the I-beam prior to the insertion of the wood block may be utilized. These prior systems are not entirely satisfactory because they require an expensive and time consuming dual operation for stiffening and attachment, and further result in the introduction of combustible material in the underpinnings of what otherwise may be a fireproof or fire-rated floor system.

The new and novel clip of this invention makes possible the stiffening of a C-shaped, cold formed steel joist while concurrently attaching it to an I-beam. This new and novel invention consequently overcomes all of the deficiencies associated with prior systems.

SUMMARY OF THE INVENTION

It is an object of this invention to provide a clip for insertion into a header of C-shaped cross-section for use in stiffening the header and concurrently attaching the header to an I-beam.

It is an additional object of this invention to provide a method for stiffening a C-shaped header while concurrently attaching it to an I-beam or the like.

It is another object of this invention to provide a method for making a clip that can be inserted into a C-shaped header and which stiffens the header while concurrently attaching it to an I-beam or the like.

Other objects and advantages will become apparent upon reference to the drawings and detailed description.

The objects of this invention are accomplished by a clip for insertion into a C-shaped header for use in stiffening the header and interengaging said header with the flange of an I-beam or the like supporting said header, said clip comprising a C-shaped channel having a back portion and two projecting side portions, said back portion having integrally depending from one end thereof means for engaging said I-beam.

In another embodiments, the back portion has integrally depending from one end thereof at least one appendage for bending over and engaging the I-beam.

In a further embodiment, the clip comprises two angularly disposed plates integrally connected along a common edge and having a height substantially equal to the interior height of the C-shaped header with one of said plates capable of extending substantially across the interior of the C-shaped header and with the other of said plates having integrally depending from one end thereof means for engaging the I-beam. Further, the clip may comprise a box-shaped stiffening portion having a multiplicity of interconnected walls for insertion into the interior of the C-shaped header, said box-shaped stiffening portion being capable of contacting a substantial portion of all the interior walls of the C-shaped header while in a stationary position, and one of the walls of the box shaped stiffening portion having integrally depending from one end thereof means for engaging the I-beam.

Additionally, in a further embodiment, the clip may have a box-shaped stiffening portion having a multiplicity of interconnected walls for insertion into the interior of the C-shaped header, said box-shaped stiffening portion capable of contacting a substantial portion of all the interior walls of the C-shaped header while in a stationary position, and one of the walls of the box-shaped stiffening portion having integrally depending from one end thereof at least one appendage for bending over and engaging the I-beam.

The new clip of this invention makes possible the new and novel combination comprising a C-shaped header, an I-beam, and a clip for interengaging the C-shaped header with the I-beam while concurrently stiffening the C-shaped header, said clip comprising a C-shaped channel having a back portion and two projecting side portions all inserted into the C-shaped channel and said back portion having means integrally depending from one end thereof for engaging said I-beam. Within this combination is the additional embodiment wherein the clip comprises two angularly disposed plates integrally connected along a common edge with said two angularly disposed plates being inserted into the C-shaped header and substantially contacting the inner portions of a cross-section thereof and with one of said plates having means integrally depending from one end thereof for engaging said I-beam. Additionally included in the combination is the aforementioned clip comprising a box-shaped stiffening portion inserted into the interior of the C-shaped header and contacting a substantial portion of the interior perimeter of a section thereof, and said box-shaped stiffening portion having a multiplicity of inner inter-connected walls with one of said walls having means integrally depending from one end thereof for engaging said I-beam.

The objects of this invention are additionally accomplished by a method for attaching a C-shaped header to an I-beam while concurrently stiffening the C-shaped header, said method comprising, inserting a clip into the C-shaped header and engaging a depending appendage of the clip with the I-beam, said clip comprising a C-shaped channel having a back portion and two projecting side portions with said back portion having integrally depending from one end thereof the appendage to be engaged by the I-beam. Another variation of the method of this invention includes inserting a clip into the C-shaped header and engaging a depending appendage of the clip with the I-beam, said clip comprising two angularly disposed plates integrally connected along a common edge and having a height substantially equal to the interior height of the C-shaped header with one of said plates extending substantially across the interior of the C-shaped header and with the other of said plates having integrally depending from one end thereof the appendage to be engaged with the I-beam. Still another embodiment of the method includes inserting a clip into the C-shaped header and engaging a depending appendage of the clip with the I-beam, said clip comprising a box shaped stiffening portion having a multiplicity of interconnecting walls for insertion into the interior of the C-shaped header whereby the box-shaped stiffening portion contacts substantial portion of all the interior walls of the C-shaped header, and wherein one of the walls of the box-shaped stiffening portion has integrally depending from one end thereof the appendage for engaging the I-beam.

It may thus be seen that the new and novel clip of this invention is one which may be inserted into a C-shaped steel joist to stiffen the steel joist and which has an appendage projecting from the bottom thereof for attachment to an I-beam or the like. The portion that is inserted into the C-shaped steel joist can take any one of numerous configurations and may be a straight plate, a C-shaped member, a box of any configuration, such as square, rectangular, or hexagonal cross-section or any such design which with insertion into the steel joist contacts the interior portion of the sides thereof and provides a stiffening support for the steel joist. The more important of the designs are those in which the stiffener is of a C-shaped nature since such a clip can be produced from a sectional piece of a steel joist of the type that is being stiffened but of a reduced size. The appendage that projects downward from the stiffening portion can be bent over prior to insertion into the steel joist, in which case it merely clips onto the I-beam. Alternatively, the appendage can be a leg projecting downward, and, after insertion into the steel joist, it may be bent over a portion of the I-beam to attach it thereto. The stiffening portion may have more than one appendage projecting downward therefrom for attachment to the I-beam, and, in such case, a projection on either side thereof capable of attachment to the respective sides of the I-beam provides additional advantages not offered by a single appendage. Additionally, the projection or appendage may be designed in such a manner that, not only may it be bent over the I-beam to attach thereto, but may additionally be provided with a surface for attachment to the I-beam by screws, rivets, welding or some other such type attachment which provides additional stability within the system. Each of these embodiments of the invention are highly acceptable for use in stiffening C-shaped steel joists while concurrently attaching them to I-beams.

BRIEF DESCRIPTION OF THE DRAWINGS

This invention may be more fully described, but is not limited by, the attached drawings wherein.

DESCRIPTION OF THE PREFERRED EMBODIMENTS

Figure 1:
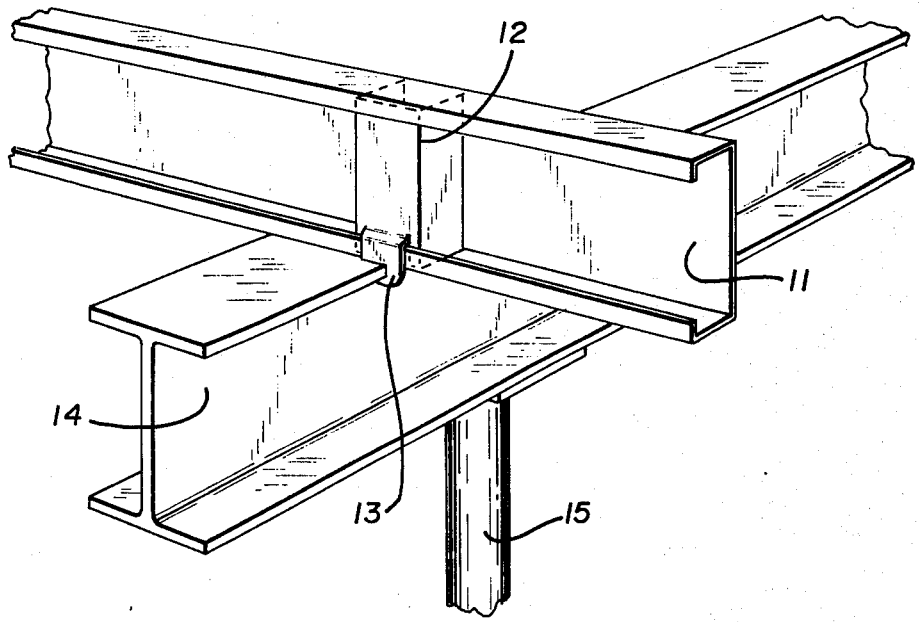
FIG. 1 is a perspective view of a joist mounted on an I-beam utilizing a C-shaped clip having one appendage in a clip fashion extending therefrom.
Figure 2:
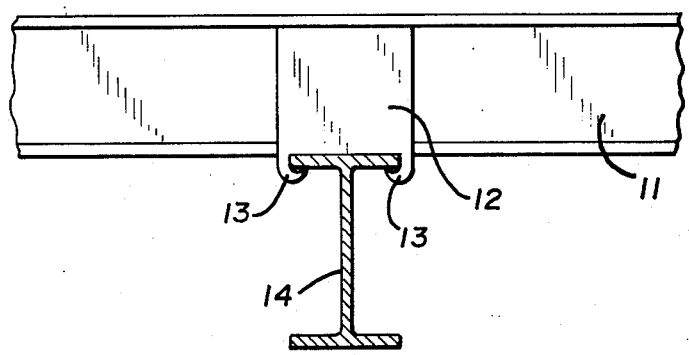
FIG. 2 is a side view of the general structure of FIG. 1 illustrating a C-shaped clip having two appendages extending therefrom and attached to the I-beam.
Figure 3:
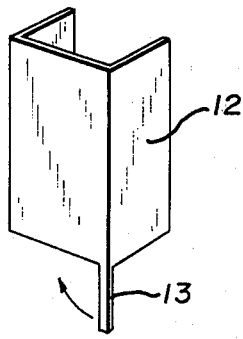
FIG. 3 is a perspective view of a clip having a leg projecting downward therefrom.
Figure 7:
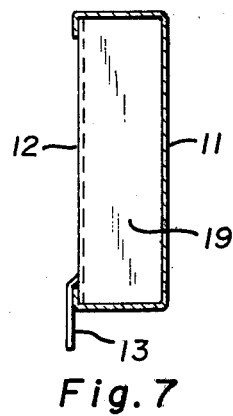
FIG. 7 is an end view of a joist having the clip of FIG. 6 inserted therein.

This invention may be more fully explained, but is not limited by, the attached drawings illustrating preferred embodiments of this invention. In the drawings, numeral 11 refers to a C-shaped cold-formed, steel joist with a clip 12 inserted in the steel joist and, as shown in FIGS. 1, 2, and 7, the clip is attached to an I-beam 14. In FIGS. 1 and 2 the appendage or leg 13 is shown bent over and attached to the top of I-beam 14, which may in turn be supported in any conventional manner such as column 15 shown in FIG. 1. In FIG. 1, the clip is shown to be a C-shaped stiffening portion with the appendage being a clip already formed. In FIG. 2, the appendages 13 project from opposing sides of the stiffening section and are attached to opposing sides of the top of the I-beam. In FIG. 3, the appendage 13 is shown constructed in a downward fashion and in use must be bent over to attach to the I-beam after the clip is inserted into the steel joist to stiffen it.

Figure 4:
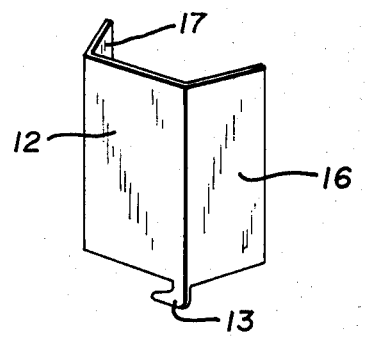
FIG. 4 is a perspective view of a clip wherein the stiffening portions of the clip are not in a true C fashion but are divergent at an obtuse angle from the back base thereof.
Figure 5:
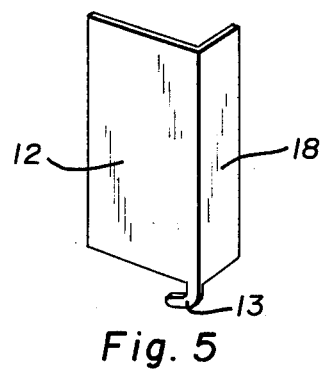
FIG. 5 is a perspective view of a clip having only two plates with one of the plates used for stiffening the C-shaped steel joist.
Figure 6:
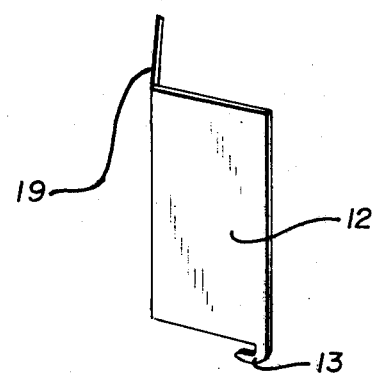
FIG. 6 is a perspective view of a like design with the appendage being attached at the other side of the backplate.
Figure 8:
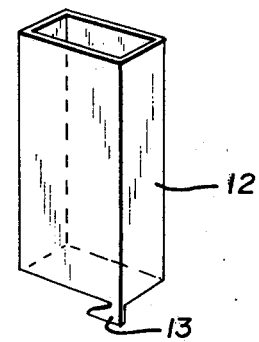
FIG. 8 is a perspective view of a clip with a box-shaped stiffening section.

In FIG. 4, the opposing sides, 16 and 17, are shown at obtuse angles to the backplate, as opposed to the perpendicular relationship shown in the previous figures. In FIG. 5, a single plate 18 is shown attached to the backplate of the clip with the plate 18 being used for stiffening the cold-formed, C-shaped steel joist. In FIG. 6, the plate 19 is attached to the side of the backplate opposite that shown in FIG. 5. In FIG. 7, the clip of FIG. 6 is shown from an end view. It must be noted that the plate 19 must essentially fill a cross section of the C-shaped joist in order to substantially support the top thereof. In other words, the section should essentially fill a cross sectional area of the C-shaped metal joist and contact substantially the entire portion of the interior of the cross section of the C-shaped joist. In FIG. 8, a box-shaped stiffening portion is shown, and this box-shaped section may be as shown with the sides all attached, or one or more of the sides may be left open not being required to be connected as a closed unit if such is undesirable in the cost of manufacture.

Figure 9:
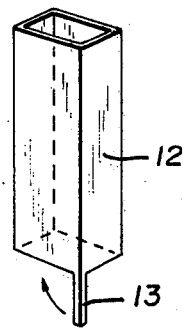
FIG. 9 is a perspective view of a clip having a box-shaped stiffening section, but with an appendage projecting downward therefrom which can be bent over and attached to the I-beam.
Figure 10:
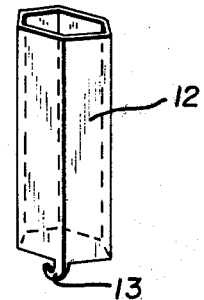
FIG. 10 is a perspective view of a clip with a hexagonally shaped stiffening section with a clip appendage extending therefrom.

In FIG. 9, a box shaped stiffening section is shown with the appendage or leg which projects downward being shown in a straight down position and thereafter being bent over the I-beam for connection thereto. It must be understood that in any of the embodiments of this invention, the appendage or leg may project downward and then be bent over the I-beam later or may be formed in the form of a clip for clipping on to the I-beam during the construction of the overall stiffener clip itself. Likewise, the appendage may have means provided therein for attachment to the I-beam by any such common method as screws, rivits, welding or the like, not shown in the drawings. In FIG. 10, another embodiment of a box-shaped stiffening portion is shown, in this instance a hexagonal shape of a box nature which provides a stiffening function to the C-shaped steel joist.

Figure 11:
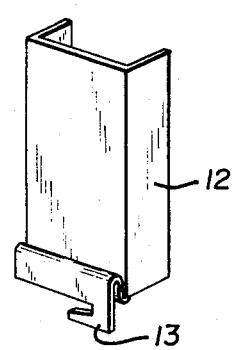
FIG. 11 is a perspective view of a clip showing an alternative design for the depending leg portion.
Figure 12:
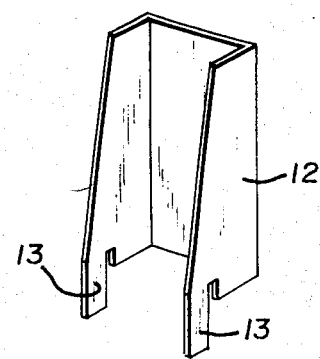
FIG. 12 is a perspective view of still another design of the stiffening and leg portions.

It must be understood that if the bottom of the C-shaped joist has an upward projecting lip thereon, the appendage must have a design to accommodate this feature, such as being bent up and over or out and over the lip before projecting downward for attachment to the I-beam. In FIG. 1, for instance, the appendage is bent out and over the lip. In FIG. 11, the appendage is bent up and over the lip. In FIG. 12, still another design is provided wherein the clip is flared outward and slotted to accommodate the lip.

In providing the combination of a stiffened steel joist attached to an I-beam, it is preferable to first insert the stiffening portion of the clip into the steel joist and then move it along until it engages the I-beam. At this point, it will either interlock with the I-beam, or else the appendage may be bent over and attached to the I-beam with a clipping feature, or alternately it may be attached in some other conventional manner. In forming the clip, a plate is formed, having an appendage therefrom, and the plate is then bent in an appropriate manner to accommodate the interior of the steel joist and thereby stiffen the steel joist against deformation.

It may thus be seen that the clip and methods for production and use thereof, as described herein, are new and unique. It may also be seen that this invention provides an economical way for stiffening cold-formed, steel joists while concurrently attaching them to I-beams. This clip system provides in one economical function what prior systems required two functions to accomplish. Additionally, the clip of this invention may be made of a material which is fire resistant thus providing additional safety and health advantages over prior known systems.

Having fully described this new and unique invention, the following is claimed:

1. A clip for insertion into a C-shaped header for use in stiffening the header and interengaging said header with a flange of an I-beam or the like supporting said header, said clip comprising a C-shaped channel having a back portion and two projecting side portions, said back portion having integrally depending from one end thereof means for engaging said I-beam.

2. A clip for insertion into a C-shaped header for use in stiffening the header and interengaging said header with a flange of an I-beam or the like supporting said header, said clip comprising a C-shaped channel having a back portion and two projecting side portions, said back portion having integrally depending from one end thereof at least one appendage for bending over and engaging an I-beam.

3. A clip for insertion into a C-shaped header, said header having interior walls therein and for use in stiffening the header and interengaging said header with the flange of an I-beam or the like, said clip comprising a box-shaped stiffening portion having a multiplicity of interconnected walls for insertion into the interior of the C-shaped header, said box-shaped stiffening portion capable of contacting a substantial portion of all the interior walls of the C-shaped header while in a stationary position, and one of the walls of the box-shaped stiffening portion having integrally depending from one end thereof means for engaging said I-beam.

4. A clip for insertion into a C-shaped header, said header having interior walls therein and for use in stiffening the header and interengaging said header to an I-beam or the like, said clip comprising a box-shaped stiffening portion having a multiplicity of interconnected walls for insertion into the interior of the C-shaped header, said box-shaped stiffening portion capable of contacting a substantial portion of all the interior walls of the C-shaped header while in a stationary position, and one of the walls of the box-shaped stiffening portion having integrally depending from one end thereof at least one appendage for engaging said I-beam.

5. In combination: a C-shaped header; an I-beam; and a clip for interengaging the C-shaped header with the I-beam while concurrently stiffening the C-shaped header, said clip comprising a C-shaped channel having a back portion and two projecting side portions all inserted into the C-shaped channel and said back portion of said clip having means integrally depending from one end thereof engaging said I-beam.

6. In combination: a C-shaped header; an I-beam; and a clip interengaging the C-shaped header with the I-beam while concurrently stiffening the C-shaped header, said clip comprising two angularly disposed plates integrally connected along a common edge with said two angularly disposed plates being inserted into the C-shaped header and substantially contacting the inner portions thereof, and one of said angularly disposed plates having means integrally depending from one end thereof for engaging said I-beam.

7. In combination: a C-shaped header; an I-beam; and a clip interengaging the C-shaped header with the I-beam while concurrently stiffening the C-shaped header, said clip comprising a box-shaped stiffening portion inserted into the interior of the C-shaped header and contacting a substantial portion of the interior perimeter of a section thereof, and said box-shaped stiffening portion having a multiplicity of inner inter-connected walls with one of said walls having means integrally depending from one end thereof for engaging said I-beam.

8. A method for attaching a C-shaped header to an I-beam while concurrently stiffening the C-shaped header, said method comprising: inserting a clip into the C-shaped header, and engaging a depending appendage of the clip with the I-beam, said clip comprising a C-shaped channel having a back portion and two projecting side portions, said back portion having integrally depending from one end thereof the appendage for engaging the I-beam.

9. A method for attaching a C-shaped header to an I-beam while concurrently stiffening the C-shaped header, said method comprising, inserting a clip into the C-shaped header, and engaging a depending appendage of the clip with the I-beam, said clip comprising two angularly disposed plates integrally connected along a common edge and having a height substantially equal to the interior height of the C-shaped header with one of said plates extending substantially across the interior of the C-shaped header and with the other of said plates having integrally depending from one end thereof the appendage to be engaged with the I-beam.

10. A method for attaching a C-shaped header to an I-beam while concurrently stiffening the C-shaped header, said method comprising, inserting a clip into the C-shaped header, and engaging a depending appendage of the clip with the I-beam, said clip comprising a box-shaped stiffening portion having a multiplicity of interconnecting walls for insertion into the interior of the C-shaped header thereby contacting a substantial portion of all the interior walls of the C-shaped header, and one of the walls of the box-shaped stiffening portion having integrally depending from one end thereof the appendage to be engaged with the I-beam.

* * * * *